United States Patent [19]

Kato

[11] Patent Number: 4,796,243
[45] Date of Patent: Jan. 3, 1989

[54] TIME BASE CORRECTING APPARATUS

[75] Inventor: Hideaki Kato, Tokyo, Japan

[73] Assignee: NEC Corporation, Japan

[21] Appl. No.: 166,729

[22] Filed: Mar. 1, 1988

Related U.S. Application Data

[63] Continuation of Ser. No. 876,482, Jun. 20, 1986, abandoned.

[30] Foreign Application Priority Data

Jun. 21, 1985 [JP] Japan ................................. 60-135652
Jul. 19, 1985 [JP] Japan ................................. 60-159570

[51] Int. Cl.$^4$ ............................................ H04N 5/94
[52] U.S. Cl. .................................. 360/36.2; 360/37.1; 360/38.1; 358/319; 358/336; 358/339; 371/47
[58] Field of Search ................. 360/26, 51, 36.2, 37.1, 360/38.1; 358/319, 320, 327, 336, 337, 339, 340; 371/37, 47, 58, 60

[56] References Cited

U.S. PATENT DOCUMENTS

| | | | |
|---|---|---|---|
| 3,873,920 | 3/1975 | Apple, Jr. et al. | 371/47 X |
| 4,027,283 | 5/1977 | Tang | 371/51 X |
| 4,208,650 | 6/1980 | Horn | 371/47 |
| 4,357,702 | 11/1982 | Chase et al. | 371/47 X |
| 4,375,100 | 2/1983 | Tsuji et al. | 371/51 X |
| 4,377,863 | 3/1983 | Legory et al. | 371/42 |
| 4,437,125 | 3/1984 | Yamamoto | 360/38.1 X |
| 4,446,490 | 5/1984 | Hoshini et al. | 360/37.1 |
| 4,461,002 | 7/1984 | Nanko | 371/47 |
| 4,486,780 | 12/1984 | Ive | 360/36.2 |
| 4,525,840 | 6/1985 | Heinz et al. | 371/47 |
| 4,542,351 | 9/1985 | Okada | 360/37.1 X |
| 4,680,658 | 7/1987 | Tatami | 360/36.2 |
| 4,904,675 | 9/1983 | Karchevski | 371/47 |

FOREIGN PATENT DOCUMENTS

| | | | |
|---|---|---|---|
| 59-94300 | 5/1984 | Japan | 371/51 |
| 2082825 | 3/1982 | United Kingdom | 360/37.1 |
| 2120423 | 11/1983 | United Kingdom | 358/339 |

OTHER PUBLICATIONS

Smpte Journal, No. 3, vol. 89, Mar. 1980, pp. 173–180, "An Experimental Digital Video Tape Recorder"; Yokoyama et al.

Primary Examiner—Aristotelis M. Psitos
Attorney, Agent, or Firm—Ostrolenk, Faber, Gerb & Soffen

[57] ABSTRACT

A time base correcting circuit for a digital video tape recorder incorporates a circuit improvement which ameliorates the consequences of erroneous synchronizing address data which is at times supplied with the digitized video signal. Since normally the synchronized address data is incremented for each subsequent block of digital data, the circuit compares incoming synchronized address data to an internally calculated address data field. If the incoming synchronized address data does not match the self-generated synchronized address data, the self-generated address data is substituted for the incoming address data. Preferably, the correction is provided only over short predetermined periods. The circuit reduces degradation of the video signal which is otherwise caused by reception of inaccurate synchronized address data.

9 Claims, 4 Drawing Sheets

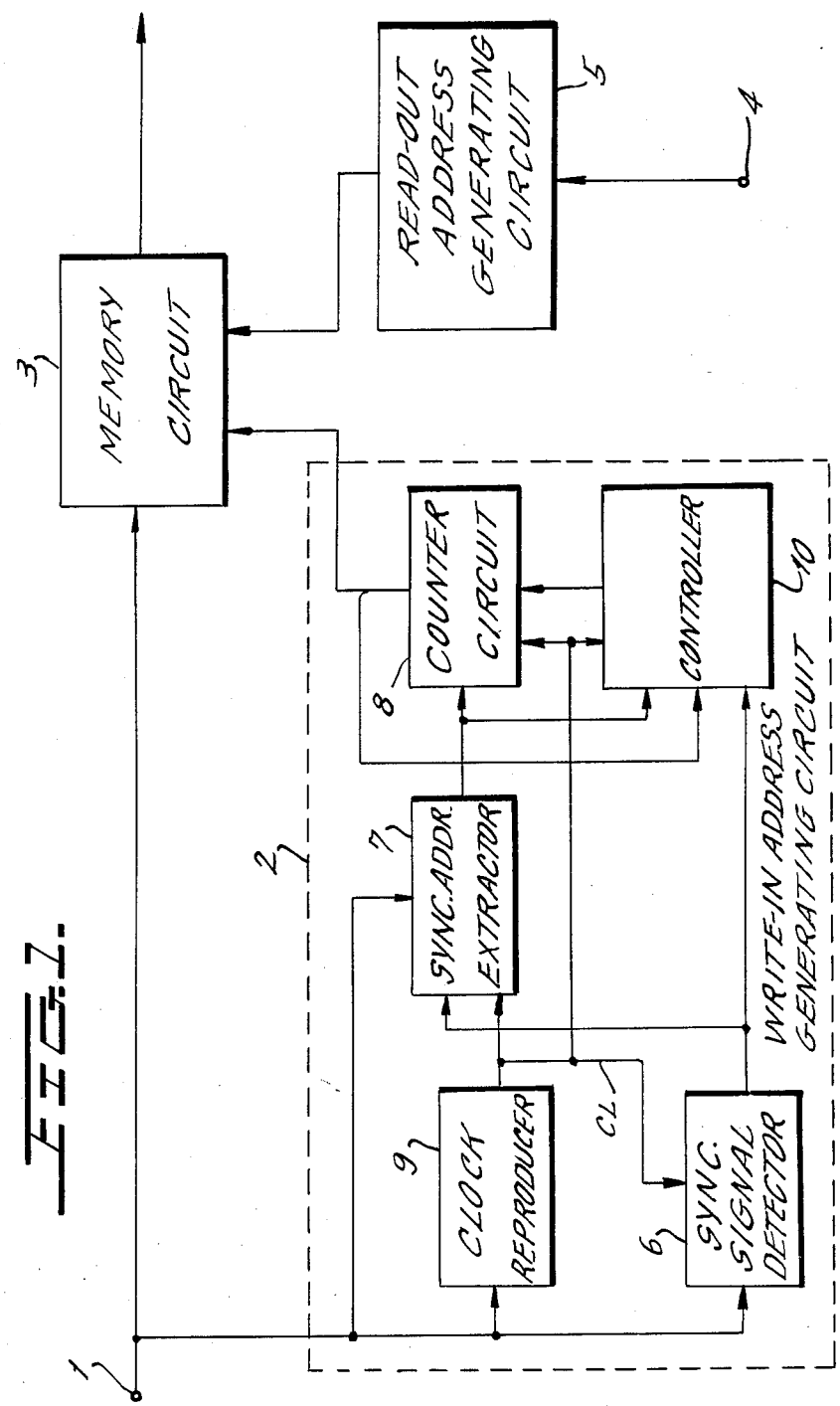

TIME BASE CORRECTING APPARATUS

This is a continuation of application Ser. No. 876,482 filed on June 20, 1986, now abandoned.

BACKGROUND OF THE INVENTION

The present invention relates to a time base correcting circuit for removing a time base error contained in a memory stored signal which signal is read out from the memory and, more particularly, to a time base correcting circuit for a digital video tape recorder.

In a digital video tape recorder ("VTR"), a video signal is converted into a digital video signal. The digital signal is in the form of a data train, divided into data blocks each containing about 200 to 1,000 bits of data A synchronizing signal having a predetermined bit pattern and a synchronizing address for identifying each block are added to each data block. A predetermined number of blocks are combined to form one sector. As a result, a periodic signal format in which the sector is repeated is formed. The sectored digital signal is recorded on a magnetic tape.

An error detection code may be added to the synchronising address. Generally, in recording and reproducing in a VTR, a time base fluctuation occurs which can produce a time base error in a reproduced signal. Such time base error is removed by a time base correcting circuit ("TBC"). In a digital VTR, an output signal of the TBC is supplied to an error correction process in which an error of data is corrected by using an added error correction signal such as a CRC code, and a D/A converting process to obtain an analog video signal.

The operational characteristics of the TBC are such that, as is well known in the art, a reproduced signal from the VTR is written in a memory in a write-in address synchronized with a clock which is extracted from the reproduced signal and which contains the time base fluctuation. Next, the stored signal is read out from the memory on the basis of a read-out address which is synchronized to a reference clock which is free from the time base fluctuation. In the TBC of the digital VTR, the write-in address is produced on the basis of the respective synchronizing address of each block, which synchronized address is extracted from the reproduced signal. Therefore, if the synchronizing address extracted from the reproduced signal is erroneous or an error is introduced in the extracting process, the respective block data linked to the erroneous synchronizing address will not be written in the correct memory locations and incorrect images are reproduced.

In the prior art, therefore, an error detection code is added to the synchronizing address to verify the correctness of the synchronizing address. When the synchronizing address is erroneous, the writing operation of the block data is inhibited. The TBC described above is disclosed, for example, in U.S. Pat. No. 4,398,224 entitled "Time Base Correcting Apparatus" issued Aug. 9, 1983.

If the writing operation is inhibited in the TBC because of the detection of the erroneous synchronizing address, the video data error correction process which follows the TBC, causes a data block from one of the preceding periods to be read out instead. Or a block data corresponding to the block inhibited from being written is not obtained. Thus, a characteristic of the error correction in the error correcting process becomes lower. This results in degradation of the quality of the reproduced video signal.

SUMMARY OF THE INVENTION

It is, therefore, an object of the present invention to provide a time base correcting circuit which minimizes the undesirable influences on the error correction process which follows the TBC circuit even if an erroneous synchronizing address is extracted.

Another object of the present invention is to provide a time base correcting circuit which can transmit correct block data to the subsequent error correction process even when the extracted synchronizing address is erroneous.

According to the present invention, there is provided a time base correcting apparatus which comprises: a memory circuit for temporarily storing an input reproduced signal of the type having data blocks, a synchronizing signal and synchronizing address in each respective data block; a write-in address generating circuit synchronized with the input reproduced signal for generating write-in addresses for writing the input reproduced signal in the memory circuit; and a read-out address generating circuit synchronized with a reference signal for generating read-out addresses for reading out a written signal from the memory circuit.

The write-in address generating circuit includes: a synchronizing signal detector for detecting the synchronizing signal from the input reproduced signal; a synchronizing address extracting circuit for extracting the synchronizing address from the input reproduced signal; an address counter which is responsive to a control signal for generating write-in addresses on the basis of either the synchronizing address extracted by the synchronizing address extracting circuit or a calculated address obtained by calculating a present synchronizing address from the address of the preceding block; and control means for comparing the synchronizing address extracted by the synchronizing address extracting circuit to the calculated address to generate a control signal which selects the calculated address when an inconsistency which is within a period having a predetermined number of blocks is present.

BRIEF DESCRIPTION OF THE DRAWINGS

FIG. 1 is a block diagram showing one embodiment of the present invention.

DESCRIPTION OF THE PREFERRED EMBODIMENT

Figure 2A:
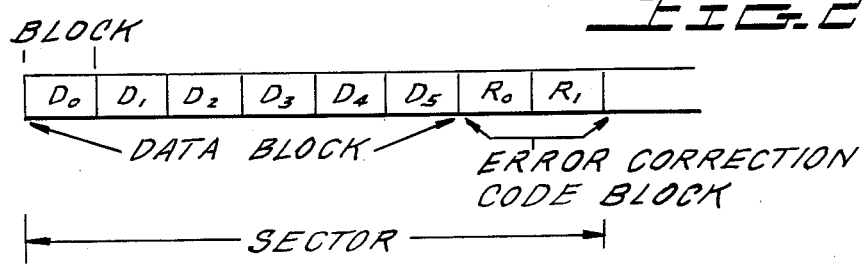
FIGS. 2(a) and 2(b) are diagrams showing one example of a signal format that is recorded in a digital VTR.

FIG. 1 shows one embodiment of the present invention in which digital, an input signal fed to a terminal 1, is reproduced from a recording medium, for example, a digital video signal of a digital VTR. The input signal at terminal 1 is written in a memory 3 at a write-in address containing time base fluctuation which is generated by write-in address generating circuit 2. Controlled by a reference signal supplied from terminal 4, read-out address is generated by a read-out address generating circuit 5. Thus, the stored signal is read out in accordance with the read-out address. The output signal from which a time base error is removed is supplied to a subsequent (or downstream) error correction circuit and a D/A converter (not shown).

Figure 2B:
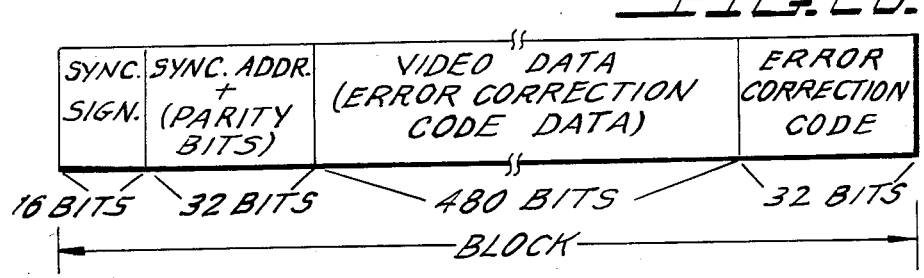

It is assumed that the input signal at terminal 1 has a signal format as shown in FIGS. 2(a) and 2(b). In FIG. 2(a), a sector includes six video data blocks $D_0$ to $D_5$ and two correction code blocks $R_0$ and $R_1$. Further, and as shown in FIG. 2(b), each block contains a synchronizing signal having a predetermined Sync bit pattern, a synchronizing address having a bit pattern which identifies each block, video data and a correction code.

Reverting to FIG. 1, write-in address generating circuit 2 includes a synchronizing signal detector 6, a synchronizing address extractor 7 which extracts the synchronizing address contained in the input signal in response to the synchronizing signal detected by the synchronizing signal detector 6 and a counting circuit 8 which generates the write-in address in response to the synchronizing signal and the synchronizing address. A clock reproducer 9 reproduces a clock pulse from the input signal and feeds it to the respective circuits 6, 7 and 8. In the instant embodiment, memory 3 includes at least two sets of memory areas, for write-in and read-out operations which are complementarily switched.

Figure 3:
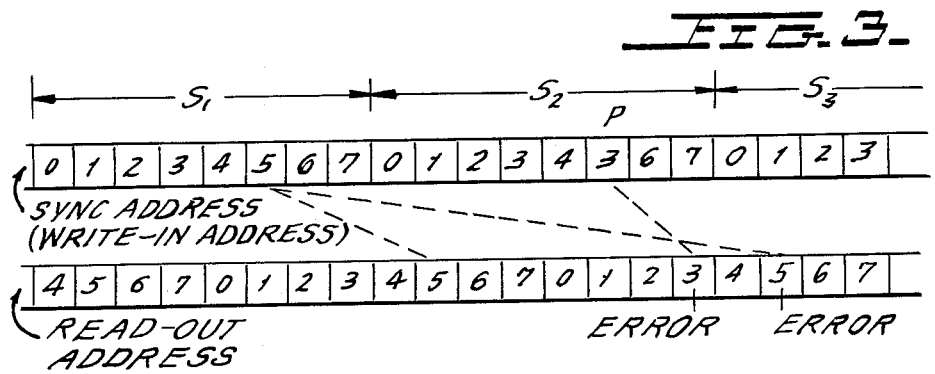
FIG. 3 is a diagram for explaining the operation of a time base correction circuit according to the prior art.

In the prior art, counting circuit 8 is operated in response to the synchronizing address extracted by synchronizing address extractor 7 to generate write-in addresses for the block designated by that synchronizing address to store the input signal into the memory circuit 3. The operation of the prior art is described with reference to FIG. 3. FIG. 3 shows the relationship between the synchronizing address (a part of the write-in address) and part of the read-out address when the time difference between the write-in and read-out operations is about four blocks. In FIG. 3, the synchronizing addresses "0" to "7" correspond to eight blocks contained in one sector, which sectors are periodically repeated. Now, if the synchronizing address, which should be "5" at point P in sector $S_2$, is erroneously read as "3", the block data corresponding to this synchronizing address is written in the memory 3 designated by the erroneous synchronizing address "3". As a result, the block data, which are intrinsically read out at the address "5", are read out at the read-out address "3" so that the wrong data block is sent to the subsequent error correction process. Moreover, the block data to be read out at read-out address "5" are that which have been written eight blocks before, i.e., written in the one-preceding sector $S_1$ so that the read-out data block become erroneous. On the other hand, even if the writing operation of the block data is inhibited when an error of the synchronizing address is detected, correct block data cannot be delivered from address "5" at the memory 3. Therefore, the reproduced video signal finally obtained is degraded in quality.

According to the present invention, a substitute calculated synchronizing address is generated on the basis of a preceding synchronizing address if the correctly continuity sequence of the synchronizing address is erroneously lost for a short time. The block data accompanying the erroneous synchronizing address is written into the memory by using the substitute or calculated synchronizing address. In other words, when the synchronizing address is erroneous for a short time, for example, one block period, it is assumed that the other data, for example, the video data in the block data is still correct. Therefore, the other data is written in the memory at a location of the substitute synchronizing address. The still correct other data, which is otherwise lost in the prior art, is fed to the subsequent error correction process so that the quality of the reproduced video signal is maintained. By using the substitute synchronizing address, moreover, it is possible to eliminate the problem of losing the data block stored in the memory area corresponding to another synchronizing address, i.e., the address "3" in the case of FIG. 3.

In the present embodiment, counting circuit 8 generates a write-in address signal of 10 bits, $A_0$ to $A_9$. The three most significant bits $A_7$ to $A_9$ identify data blocks. They are generated by loading the synchronizing address extracted by synchronizing address extractor 7 in a normal operation or, by using a substitute synchronizing address if the synchronizing address is discontinuous for a predetermined short period (e.g., one-block period in the embodiment). Controller 10 checks for and detects any discontinuity in the synchronizing address and selects which synchronizing address source will be used.

Figure 4:
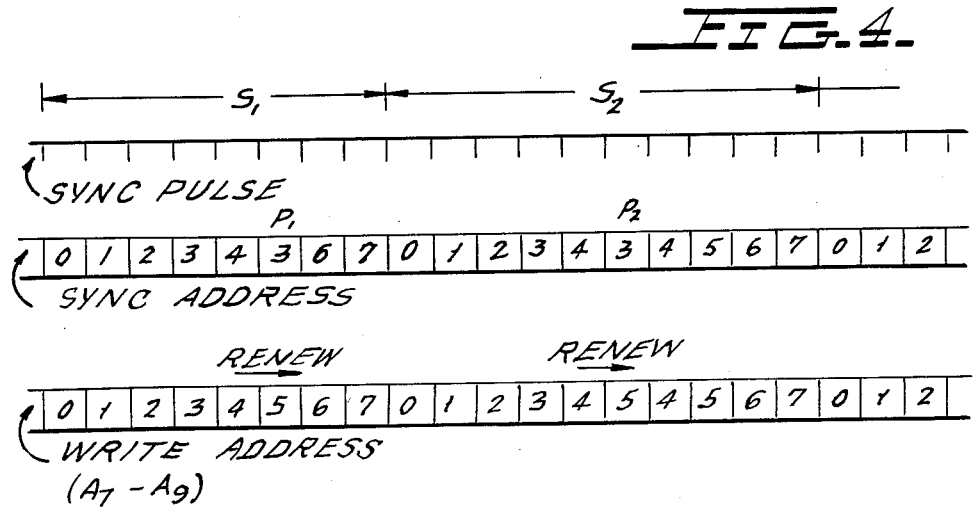
FIG. 4 is a diagram for explaining an operation of the embodiment shown in FIG. 1.

FIG. 4 diagrammatically aids in explaining the operation of the present invention. For the case where the synchronizing address is erroneously "3" at a point $P_1$ in sector $S_1$ the substitute synchronizing address "5" which is derived or calculated from the previous address "4" is used. Further, when the sequence of the synchronizing address is switched at a point $P_2$ in sector $S_2$, the substitute synchronizing address "5" is used instead of address "3" in the subsequent block. But a following synchronizing address "4" in the newly switched sequence is loaded and is used as the write-in address in the further subsequent block. Control of the aforementioned selection is provided by controller 10.

Figure 5:
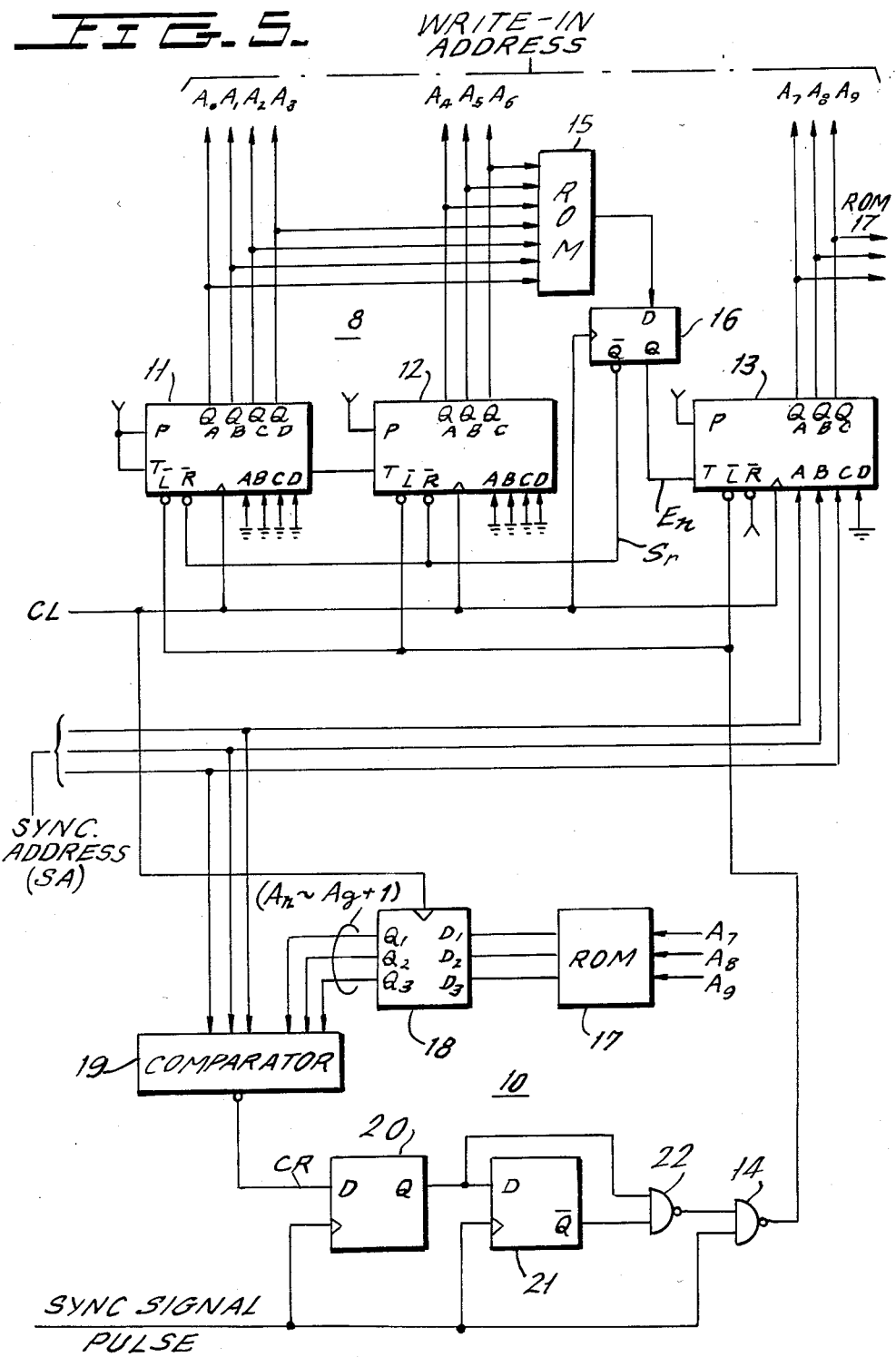
FIG. 5 is a detailed circuit for the a counter circuit and controller of FIG. 3.

FIG. 5 is a circuit diagram of counting circuit 8 and controller 10 for the embodiment of FIG. 1. Counting circuit 8 includes counters 11 and 12 which generate least significant bits $A_0$ to $A_6$ of write-in addresses $A_0$ to $A_9$, counter 13 which generates the three most significant bits $A_7$ to $A_9$ which identify the blocks. The operation of counters 11, 12 and 13 is as follows. If the synchronizing address is correct, the synchronizing signal pulse Sync delivered from synchronizing signal detector 6 (FIG. 1) is fed through gate 14 in controller 10 to the load control terminals of counters 11, 12 and 13. Thus counters 11 and 12 are loaded with a zero whereas counter 13 is loaded with the synchronizing address SA delivered from synchronizing address extractor 7. Thereafter, in response to the clock pulse CL generated by clock reproducer 9, counters 11 and 12 generate the seven least significant bits $A_0$ to $A_6$ of the write-in address. As shown in FIG. 2(b), each block contains a 16 bit synchronizing signal, a 32 bit synchronizing address, 480 bits of the video data and a 32 bit correction code for a total of 560 bits. Therefore, when writing and reading is carried out at 8 bits at a time, addresses "0" to "69" (a total of 70 addresses) are used for one block i.e. 8 bits×70 addresses equals 560 bits. Seven bits $A_0$ to $A_6$ are necessary for generating the 70 addresses.

In the present embodiment, the synchronizing address contains 32 bits. Rather redundant, since only three bits for identifying eight blocks are utilized for the present invention. Read only memory (ROM) 15 is operative to feed an output when the address $A_0$ to $A_6$ reaches "68". As a result, a reset signal $S_r$ for counters 11 and 12 is outputted from a subsequent latch circuit 16 when the address reaches "69". At that time, counters 11 and 12 are reset to provide an initial count value of zero. An enable signal $E_n$ is fed from latch circuit 16 to counter 13 to increment the value of $A_7$ to $A_9$ of counter 13 by one. Immediately thereafter, a subsequent synchronizing signal pulse Sync is fed so that the value of $A_7$ to $A_9$ of counter 13 is loaded with the value of the synchronizing address SA. As a result, the synchronizing address SA is used for the write-in address. Then, when the synchronizing address is not erroneous, the least significant address bits $A_0$ to $A_6$ repeatedly take the values "0" to "69" and the value of the most significant address bits $A_7$ to $A_9$ assume the value "0" to "7" for respective blocks.

Controller 10 operates as follows. The value of most significant address bits $A_7$ to $A_9$ of counter 13 in counting circuit 8 is fed to a ROM 17, in which the value of bits $A_7$ to $A_9$ is updated by being incremented by one. The resultant value is sent through a latch circuit 18 to comparator 19. Comparator 19 receives the synchronizing address SA as its other input. As a result, when the synchronizing address SA is extracted by synchronizing address extractor 7 (FIG. 1), comparator 19 compares the synchronizing address SA with the updated synchronizing address to check the continuity of the synchronizing address. If the comparison result confirms continuity, i.e., equality, the comparator delivers an output CR which could be a low logic level, for example. Comparison output CR is sequentially fed to two-stage D-type flip-flops (hereinafter "D-F.F.") 20 and 21. A NAND gate 22 outputs a logical product of the output of the D-F.F. 20 and the inverted output of D-F.F. 21. If the comparison output CR of the comparator 19 remains at the low level, the output gate 22 is a high logical level and NAND gate 14 passes the synchronizing signal pulse Sync to the load control signal of counters 11, 12 and 13.

If the synchronizing address has lost the continuity for the one-block period, the comparator output CR will be high for the one-block period. In this case, the output of NAND gate 22 becomes low and gate 14 inhibits the synchronizing signal pulse Sync. Accordingly, since the load control signal is not fed to counters 11 to 13, counter 13 is not loaded with the synchronizing address SA. As a result, counter 13 holds the instead substituted synchronizing address which has been incremented by one from the preceding synchronizing address in response to the enable signal $E_n$ delivered from latch circuit 16. The synchronizing signal pulse Sync is not supplied as a load control signal to counters 11 and 12. But reset signal $S_r$ at latch circuit 16 is applied to counters 11 and 12 to clear them.

Figure 6:
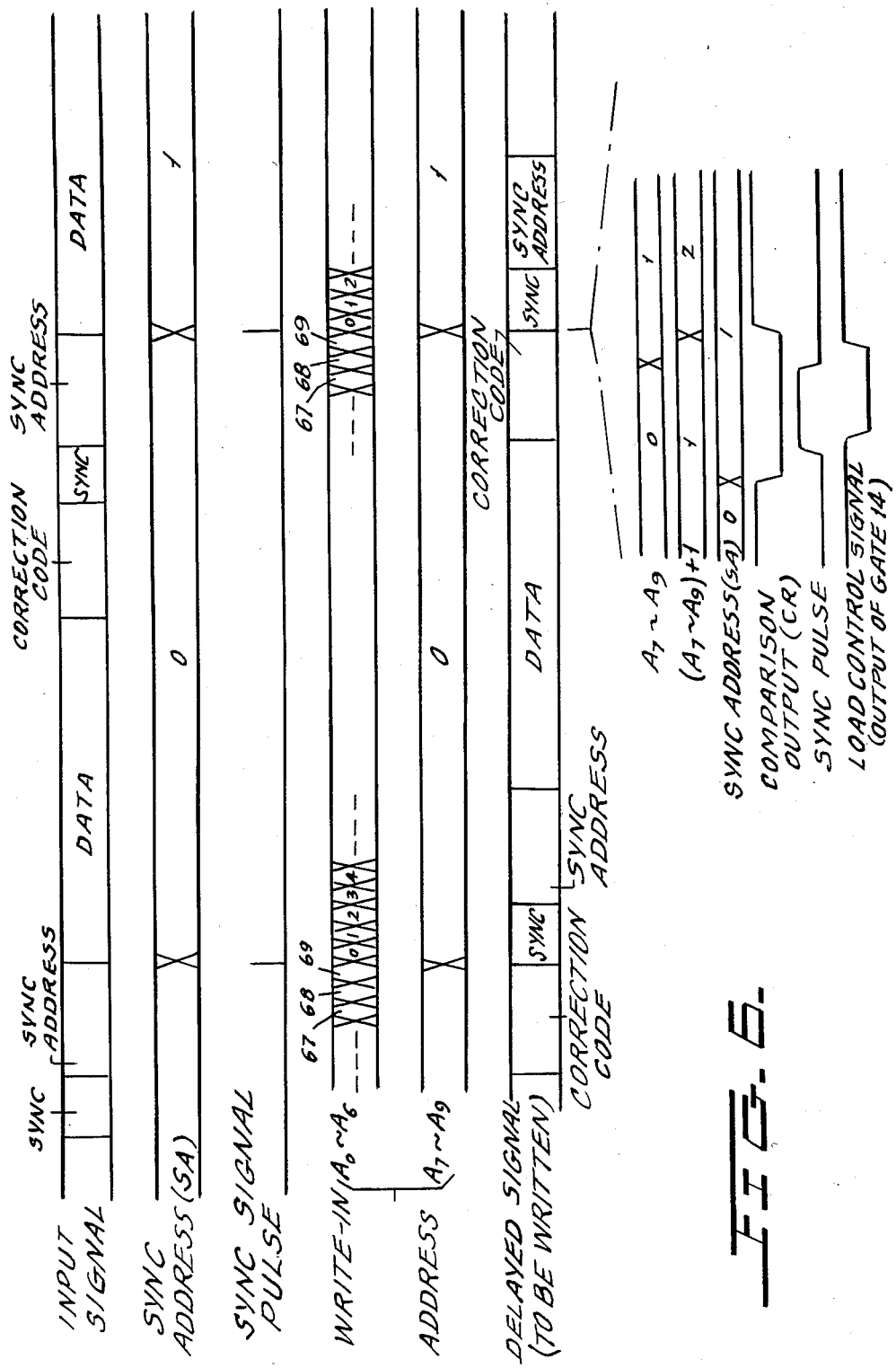
FIG. 6 is a timing chart for explaining the operation of the counter circuit shown in FIG. 5.

When the discontinuity of the synchronizing address extends over the two-block period, comparator 19 delivers a high logical level for the two-block period. In this case, the output of the gate 22 becomes high at the second block so that gate 14 passes the synchronizing signal pulse Sync as the load control signal to counters 11, 12 and 13. As a result, the counter 13 is loaded with the new synchronizing address SA to generate the most significant bits $A_7$, $A_8$ and $A_9$ of the write-in address. FIG. 6 is a timing chart for explaining the operation of the circuit of FIG. 5.

As described above data blocks are written into a memory by assuming the continuity even if there is discontinuity of the synchronizing address for the predetermined short period. As a result, when only the synchronizing address is erroneous but the other data, for example, video data are correct, the video data can be fed without losing to the subsequent error correction process. Further, it is possible to prevent loss of other block data by writing under the erroneous synchronizing address. As a result, a higher quality of video signal is obtained.

What is claimed is:

1. A correcting circuit for processing an input digital video signal having a plurality of data blocks, each block containing at least a synchronizing signal, a synchronizing block address, and digital data, said circuit comprising:
   synchronizing signal detecting means for detecting said synchronizing signal in said digital signal and for producing a synchronizing pulse therefrom;
   synchronizing address extracting means responsive to said synchronizing pulse for extracting said synchronizing block address from said input digital video signal;
   write address generating means for generating a write address signal, said write address signal including a current block address for selecting a block of memory locations for storing a block of said digital data therein, said write address generating means being responsive to said synchronizing pulse and said synchronizing block address;
   a memory, responsive to said write address generating means, for storing said digital data therein at locations thereof determined by said write address signal;
   first receiving means for receiving a reference signal;
   read address generating means for generating a read address signal from said reference signal, said read address signal being effective for reading said stored digital data out of said memory;
   said write address generating means including:
   second receiving means for receiving said synchronizing block address;
   a block address counter means for outputting said current block address for said digital data;
   advancing means, coupled to said block address counter means, for producing an advanced block address which exceeds the value of said current block address;
   comparing means for comparing said advanced block address to said synchronizing block address and for outputting a comparison signal which is active whenever said advanced block address and said synchronizing block address are equal to one another;
   a control circuit, coupled to said synchronizing signal pulse and to said comparison signal, for outputting a control signal having a first state, during a limited predetermined time, whenever said comparison signal is active and having a second state whenever said comparison signal is either inactive or when said comparison signal remains active beyond said limited predetermined time, said control signal of said control circuit being coupled to said block address counter means and being effective to cause said current block address of said block counter means to be set to the value of said synchronizing block address when said output signal is in its said second state and to cause said current block address to be incremented when said signal is in its said first state.

2. The circuit of claim 1, wherein said advancing means comprises a read only memory responsive to said counter means for producing said advanced block address.

3. The circuit of claim 1, further comprising means for incrementing said counter means at the end of each of said blocks.

4. The circuit of claim 1, wherein said write address generating means includes a first counter for delivering a plurality of least significant bits which determine the storage location for said digital data contained in each of said blocks; and said block address counter means comprising a second counter for delivering a plurality of most significant bits to select a respective block of memory locations for each one of said data blocks, said synchronizing block address being loaded into said second counter.

5. The circuit of claim 1, wherein said predetermined period corresponds to a period of one of said blocks.

6. A timing correcting apparatus for correcting a timing fluctuation contained in an input digital signal, said digital signal having a signal format constructed of a train of blocks, each block containing a synchronizing signal and a synchronizing address identifying each of said blocks, comprising:
    synchronizing signal detecting means for detecting said synchronizing signal contained in said input digital signal to produce a synchronizing pulse;
    synchronizing address extracting means for extracting said synchronizing address contained in said input digital signal to produce a synchronizing address signal;
    write-in address generating means for generating a write-in address signal on the basis of said synchronizing pulse and said synchronizing address signal, said write-in address signal including an address component discriminating each block;
    memory means for storing said input digital signal in response to said write-in address signal;
    reference signal receiving means for receiving a reference signal;
    read-out address generating means for generating a read-out address signal on the basis of said reference signal to read a stored digital signal out of said memory means;
    said write-in address generating means including:
    counter means loadable with said synchronizing address signal in response to the timing of said synchronizing pulse, said counter means delivering said address component discriminating each block;
    advancing means for advancing said address component delivered from said counter means by one to produce an advanced synchronizing address signal;
    inspecting means for inspecting the continuity of said synchronizing address signal by comparing said synchronizing address signal and said advanced synchronizing address signal to detect said continuity when the address signals are equal to each other; and
    control means responsive to the inspect result of said inspecting means for inhibiting said counter means from being loaded with said synchronizing address signal and for causing said counter means to be set to a value which is equal to the value of said advanced synchronizing address signal, when the continuity of said synchronizing address signal is lost within a limited predetermined period.

7. A timing correcting apparatus according to claim 6, wherein said control means includes:

inspection result storing means for sequentially storing an inspection result delivered from said inspecting means at the timing of said synchronizing pulse; and
    a logical circuit for judging the lack of said continuity of said synchronizing address signal within said limited predetermined period in response to a plurality of inspection results stored in said inspection result storing means.

8. A time base correcting apparatus according to claim 6, wherein said predetermined period corresponds to a period of one of said blocks contained in said input digital signal.

9. A time base correcting circuit for correcting a time base error contained an input digital video signal containing a time base fluctuation, said input digital video signal having a plurality of data blocks, each block containing at least a synchronizing signal, a synchronizing address, and digital data, said circuit comprising:
    synchronizing signal detecting means for detecting said synchronizing signal in said digital signal and for producing a synchronizing pulse therefrom;
    synchronizing address extracting means responsive to said synchronizing pulse for extracting said synchronizing address of said input digital signal to produce an extracted synchronizing address;
    write address generating means for generating a write address responsive to said synchronizing pulse and said extracted synchronizing address, said write address containing said time base fluctuation;
    a memory, responsive to said write address generating means, for storing said digital data therein at locations thereof determined by said write address;
    first receiving means for receiving a reference signal;
    read address generating means for generating a read address associated with said reference signal, said read address being effective for reading said stored digital data out of said memory, said read address being free from said time base fluctuation;
    said write address generating means including:
    clock generating means for generating a clock synchronized with said input digital video signal, said clock having said time base fluctuation;
    second receiving means for receiving said extracted synchronizing address;
    counter means for counting said clock to produce said write address, said write address containing an address component discriminating said each block, said counter means delivering said address component as a generated synchronizing address;
    advancing means for advancing said generated synchronizing address delivered from said counter means by one to produce a renewed synchronizing address;
    comparing means for comparing said extracted synchronizing address from said second receiving means to said renewed synchronizing address to produce a control signal, said control signal having a first state when said synchronizing address is not equal to said renewed synchronizing address during a predetermined period, and said control signal having a second state when said extracted synchronizing address is equal to said renewed synchronizing address and when non-coincidence between said extracted synchronizing address and said renewed synchronizing address continues more than said predetermined period; and control means responsive to said control signal for controlling to load said extracted synchronizing address into said counter means at a timing of said synchronizing signal when said control signal has said second state and to set an incremented address value, which is advanced by one from said generated synchronizing address, into said counter means when said control signal has said first state.

* * * * *